May 30, 1967

C. NEWMAN 3,322,000

FILE GUIDE

Filed Nov. 9, 1964

INVENTOR.
CHARLES NEWMAN
BY
*Meelin, Moore & Weisenberger*
ATTORNEYS

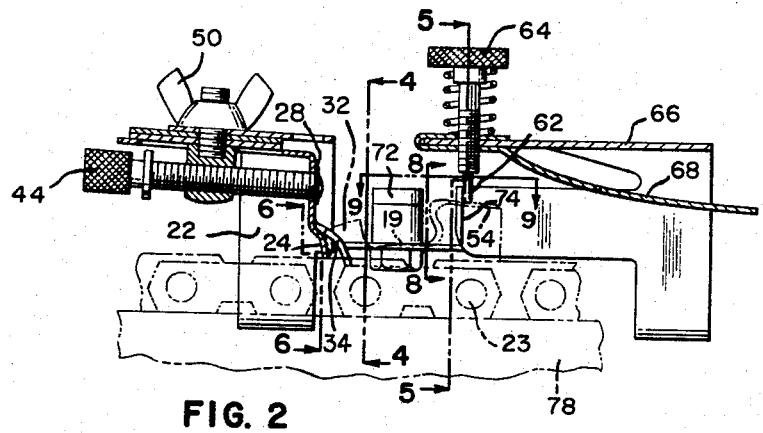
FIG. 2
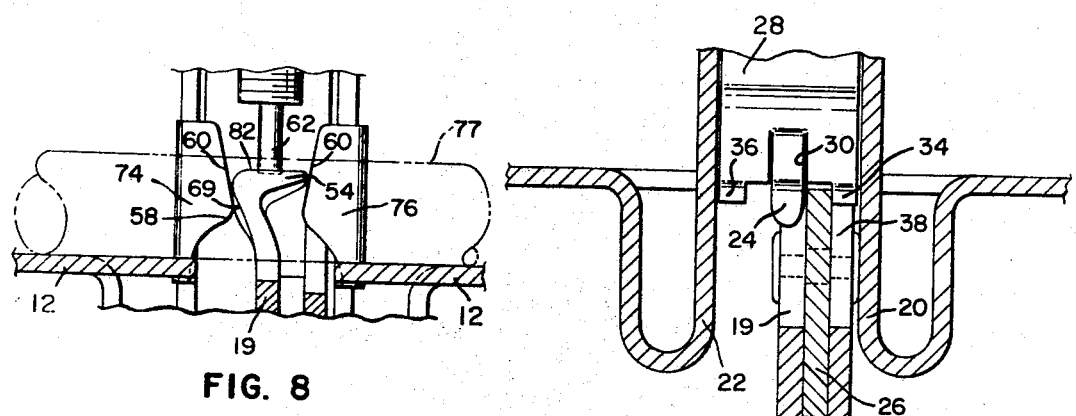
FIG. 8
FIG. 6
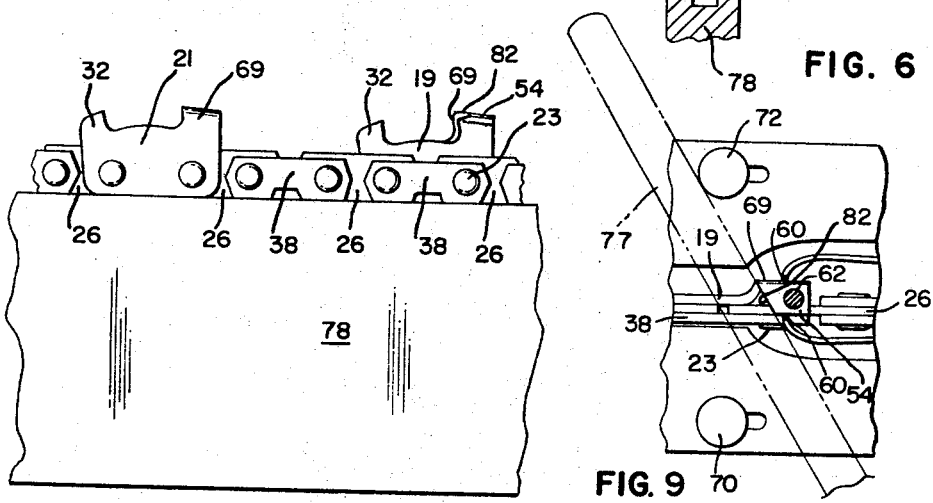
FIG. 7
FIG. 9
INVENTOR.
CHARLES NEWMAN
BY
Mellin, Moore & Weisenberger
ATTORNEYS

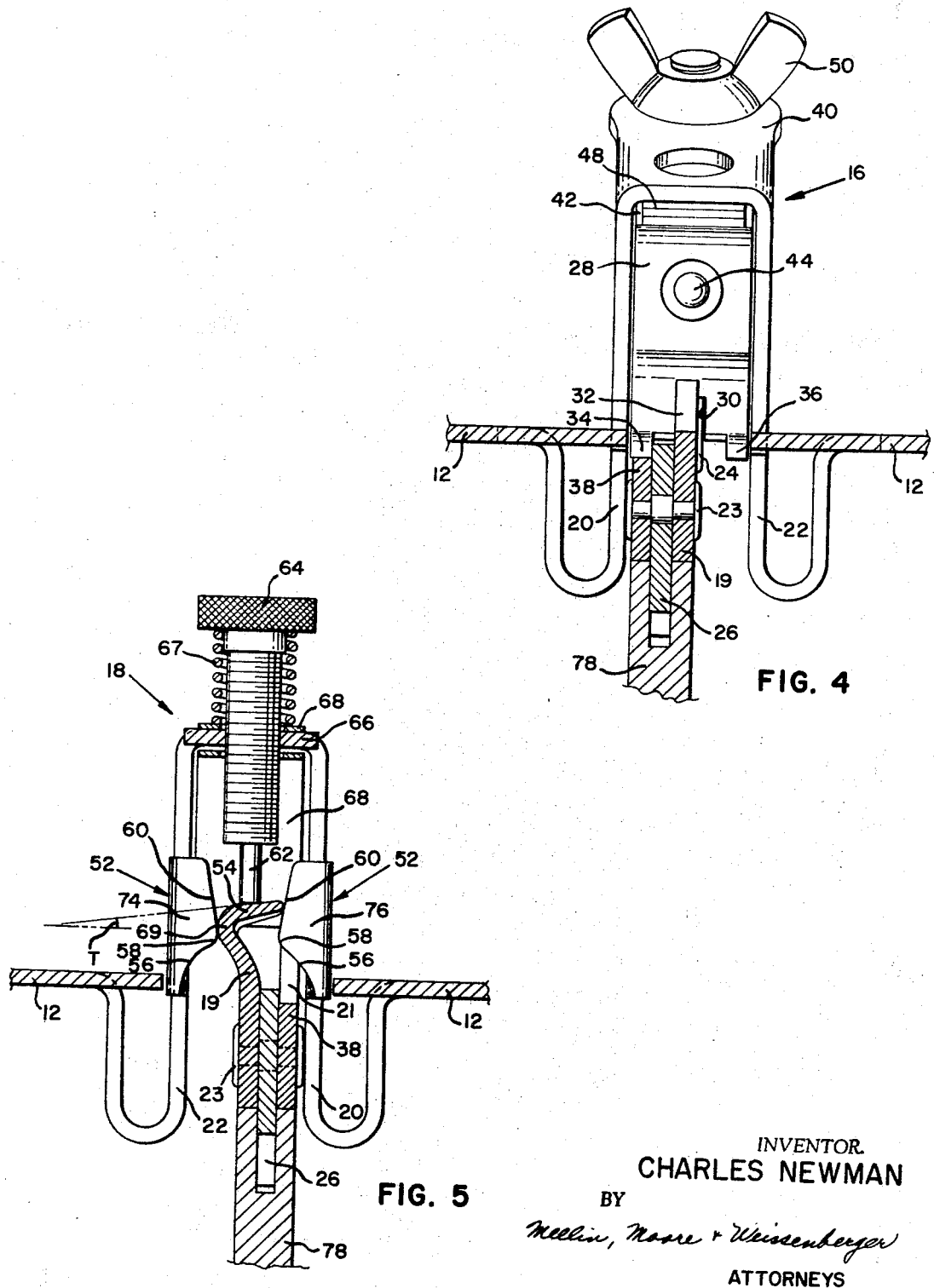

United States Patent Office 3,322,000
Patented May 30, 1967

3,322,000
FILE GUIDE
Charles Newman, 429 N. Harrison,
Fort Bragg, Calif. 95437
Filed Nov. 9, 1964, Ser. No. 409,729
15 Claims. (Cl. 76—36)

This invention relates to file guides for sharpening chain saw cutters, and more particularly to a guide which fastens directly to the cutter to be sharpened.

The accurate sharpening of chain saw cutters in place on the saw by manual filing has always presented considerable problems which have never been satisfactorily solved in the prior art. The problem arises from the fact that in order to obtain proper balance and efficient performance of the saw, all cutters have to be sharpened to exactly the same length at exactly the proper height and top plate angle, and in a direction exactly parallel to the top plate of the cutter. The problem is compounded by the fact that different cutter sizes, different degrees of chain wear, or even the cutting of different kinds of wood with the same saw, require different file sizes and filing heights. Last but not least, the filing is often done at the job site in rugged, roadless terrain and therefore requires a light, small file guide which the operator can conveniently carry with him in his pocket.

Prior art devices of this type have generally been constructed to rest either on the bar, or on the drive links, or on a cutter other than the cutter to be sharpened, or on a combination of the above. None of these solutions is satisfactory because heat, rust, wear of the bar rails and groove, and of the heels and rivets of the cutters or the rivet holes of the drive links, as well as gumming of the chain from pitch and sawdust, all contribute to random misalignment of individual cutters with respect to the rest of the mechanism. Furthermore, some prior art devices inherently require a filing platform which slopes rearwardly, in parallel relationship to the lengthwise slope of the top plate. Such guides fail to take into account the slight (5°–7°) transverse slope of the top plate, to which the file ought to be parallel for optimum sharpening.

The present invention solves the above problems and produces widely selectable, accurate, exactly reproducible results by providing a forwardly inclined filing platform which is supported and aligned only by the cutter to be filed itself, and which is readily adjustable to accommodate various file sizes and filing patterns.

It is therefore the object of this invention to provide a chain saw file guide which is supported solely by the cutter to be filed.

It is another object of the invention to provide a file guide of the type described which has a filing platform which slopes forwardly in relation to the top of the tooth.

It is a further object of this invention to provide a file guide of the type described which is adjustable to accommodate various file sizes, filing heights, and filing angles.

It is still another object of this invention to provide a universal chain saw file guide whose usefulness is not limited by the shape, size, or wear condition of the cutter to be filed.

It is a still further object of this invention to provide a file guide of the type described which can be indiscriminately used on right-hand or left-hand cutters in the same position and without change in its adjustment.

These and other objects of the invention will become apparent from a perusal of the following specification, taken in connection with the accompanying drawings, in which:

FIG. 2 is a longitudinal vertical section of the device along line 2—2 of FIG. 3, showing a right-hand cutter in place;

FIG. 4 is a transverse vertical section along line 4—4 of FIG. 2;

FIG. 5 is a transverse vertical section along line 5—5 of FIG. 2;

FIG. 6 is a fragmentary vertical section along line 6—6 of FIG. 2;

FIG. 7 is a side elevation of a portion of chain on a saw bar showing the relative position of the parts;

FIG. 8 is a fragmentary vertical section taken along line 8—8 of FIG. 2; and

FIG. 9 is a fragmentary horizontal section taken along line 9—9 of FIG. 2, showing in phantom the file position for filing a right-hand cutter.

Basically, the invention consists of a file guide which clamps onto the top and side plates of the cutter to be filed, in a laterally centered position and in height alignment therewith, and engages the (wear-free) front edge of the depth gauge for longitudinal alignment. Angular alignment in the longitudinal direction is achieved by two-point engagement of the device with the top surface of the tooth and its tie strap; and angular alignment in the transverse direction is achieved with reference to the vertical sides of the rivets and drive links, whose parallel relation to the cutter is not affected by wear nor gumming. All the aforementioned alignments are adjustable to accommodate various file sizes, filing patterns, cutter sizes, and filing lengths.

Figure 1:
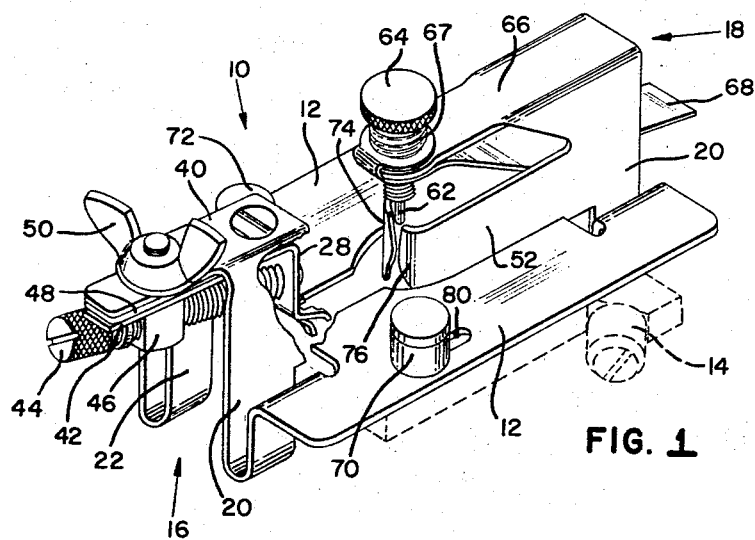
FIG. 1 is a top perspective view, partly cut away, of the device of this invention as seen from the front.
Figure 3:
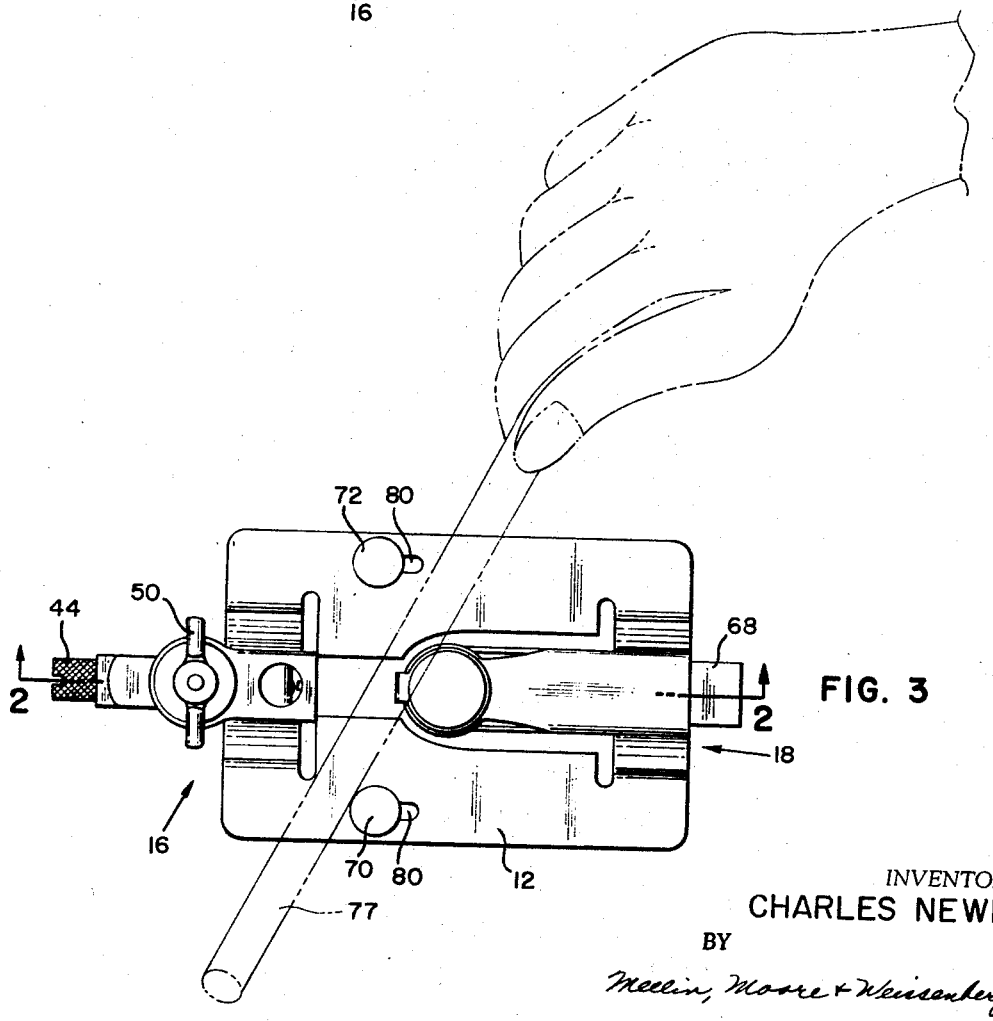
FIG. 3 is a plan view of the device, showing in phantom the file position for sharpening a left-hand cutter.

Referring now to FIG. 1, the device of this invention is generally shown at 10. It consists essentially of a frame incorporating a filing platform 12 preferably made of extremely hard spring steel to resist abrasion by the file. In the alternative, slightly resilient supporting rollers 14 (shown in dotted lines in FIG. 1) may be provided to keep the file spaced from the surface of the filing platform 12. At the front and rear ends of the device 10, respectively, saddles 16 and 18 are formed integrally with the filing platform 12. Both the saddles 16 and 18 have vertically extending shoulder pieces 20, 22 which engage the sides of the chain when the device is clamped in place. As best illustrated in FIGS. 4 and 5, the shoulder pieces 20 engage the left side of the chain when a right-hand cutter 19 (FIG. 7) is being sharpened. Likewise, the shoulder pieces 22 would engage the right side of the chain when a left-hand cutter 21 (FIG. 7) is being sharpened. The longitudinal dimension of the shoulder pieces 20 and 22 is sufficient to assure that the pieces always engage the head of at least one rivet 23 of the chain and are thus always positioned in the same relative position to the chain.

The engagement of the shoulder pieces 20 or 22 with the sides of the chain prevents the device 10 from tilting in one direction (i.e. the clockwise direction in FIG. 5 about the tip of pin 62) while the cutter is being filed; and tilt in the other direction (i.e. the clockwise direction in FIG. 4 or counterclockwise direction in FIG. 6) is prevented by engagement of the finger 24 with the side of the drive link 26 as best shown in FIG. 6.

Longitudinal and vertical alignment of the saddle 16 with respect to the cutter to be sharpened is achieved by the gauge 28, whose notch 30 engages the front edge of the depth gauge 32 of the cutter to be sharpened for longitudinal alignment, while the ears 34 or 36 (FIG. 4; depending on whether a right-hand or left-hand cutter is being sharpened) rest on the top surface of the tie strap 38 (which is always rigidly connected to the cutter) for vertical alignment.

The gauge 28 is mounted to the crown 40 of the saddle 16 by a flange 42. The crown 40 is inclined with respect to the platform 12 in such a manner as to be parallel to the longitudinal slope of the top plate of the cutter when it is in its proper sharpening position. The position of the gauge 28 can be adjusted longitudinally of the crown 40 by a set screw 44 riding in a fixed block 46, and the height of the guage 28 can be adjusted by providing shims 48 between the crown 40 and the flange 42. A wing nut 50 is provided to tighten the block 46 against the flange 42 to prevent any inadvertent movement of the guage 28 once its position has been properly adjusted.

To the rear of the saddle 16 is the saddle 18. The vertical shoulders 20, 22 of the saddle 18 carry a pair of forwardly extending spring clamps 52 of extremely hard spring steel, whose forward ends 74, 76 are bent inwardly and are shaped as best shown in FIGS. 1 and 5. When the device of this invention is snapped onto a cutter to be filed, the top plate 54 of the cutter enters into the space between the lower camming surfaces 56 and forces the spring clamps 52 apart. As the top plate 54 passes by the pointed ends 58, the upper camming surfaces 60 come into play, using the resilient force of the spring clamps 52, to draw the cutter upwardly until the top plate 54 seats firmly against the tip of the height adjusting pin 62. The height of the pin 62 can be adjusted by turning the adjustment knob 64 which is threaded into the crown 66 of the saddle 18. A spring 67 is provided to frictionally lock knob 64 against accidental turning. The crown 66 of saddle 18 also carries the end of a spring 68 which engages the depth gauge 32 of a following cutter of the chain when the device is in place and serves to bias the device 10 counterclockwise in FIG. 2 about the fulcrum formed by the engagement of camming surfaces 60 with the top plate 54 and side plate 69, so as to hold the ears 34 or 36 of the gauge 28 against the top surface of the tie strap 38 of the cutter to be filed.

Guide rollers 70, 72 are provided to cooperate, respectively, with the hard ends 74, 76 of the spring clamps 52 in restricting the rearward progress of the file during the filing operation to the precise filing length set by the adjustment of set screw 44. As best illustrated in FIG. 8, when the file 77 contacts a guide roller (e.g., 72) and the opposite spring clamp end, the file 77 is positioned at precisely 65° from the longitudinal axis of the device 10, which produces the universally correct top plate filing angle of 35°.

As best shown in FIG. 2, the device 10 holds the tooth in such a position that the platform 12 is longitudinally inclined upwardly rearwardly with respect to the top plate 54 of the tooth. The angle of inclination is so chosen that top plate cutting edge 82 (FIG. 8) is exactly parallel to the platform 12. Cutting edge 82 is parallel to platform 12, as shown in FIG. 8, because the longitudinal inclination of platform 12 with respect to top plate 54 compensates for the transverse slope of the top plate 54 indicated by the angle T in FIG. 5.

In the rare instances where filing at a different top plate filing angle is desired, the position of the guide rollers 70, 72 may optionally be made adjustable within slots 80. Such a change does affect the transverse slope compensation feature just described, but the effect is minute and can, if desired, be obviated entirely by the use of appropriate shims 48 as hereinafter described.

Operation

In use, the gauge 28 is slipped over the front edge of the depth gauge 32 of a cutter 19 or 21 to be sharpened so that the depth gauge 32 seats in the notch 30. The rear saddle 18 is then pressed down against the top plate 54 of the tooth until the top plate 54 and side plate 69 seat between the camming surfaces 60 at the height determined by the adjustment of pin 62.

The file height and angles are adjusted by appropriate interdependent settings of the shims 48 and height control 64. Following the selection of the proper file size in accordance with the chain manufacturer's recommendations, an appropriate number of shims 48 for that file size are put in place (extra shims may be stored between the wing nut 50 and the crown 40) as shown in FIGS. 1 and 2, and the height control 64 is adjusted.

If the proper shims have been used, the top plate 54 will be exactly parallel to set screw 44 when the height control 64 is set so that the distance between the platform 12 and the top plate cutting edge 82 (which, it will be recalled, is parallel to the platform 12, as best shown in FIG. 8) is 0.9 times the file diameter. With the device so set, successive filing operations can be carried out on the same chain with no further adjustments except a progressive counterclockwise (in FIG. 1) turning of set screw 44 before each new filing operation to take care of the progressive wear of the cutters. Only when the cutters are worn to the point where they require a different file size, or if it is desired to use a different file height, is it necessary to change the shims and height control adjustment.

Those skilled in the art will realize that since a change of the shim thickness without a corresponding adjustment of the height control 64 alters the longitudinal tilt angle of the platform 12 with respect to the top plate 54, non-standard angular relationships may be obtained or compensated for in this manner. However, this procedure also renders the set screw 44 non-parallel to the top plate 54 and hence requires revision of all adjustments before each filing operation. Nevertheless, within a given filing operation all cutters, both right-hand and left-hand, will still be filed to precisely identical patterns.

It will be seen that the above-described device provides a simple and effective solution to the accurate filing, in the field, of chain saw chipper cutters without disassembling or cleaning the chain. Obviously, the concepts and teachings of the invention can be adapted for other types of cutters and can be carried out in many ways of which the embodiment described is merely illustrative. Therefore, the invention is not to be deemed limited by the embodiment shown and described, but only by the scope of the following claims.

What I claim and desire to secure by Letters Patent is:

1. A file guide for filing a chain saw cutter, comprising: platform means; resilient means associated with said platform means and engageable with said cutter to support said platform means on said cutter; and positioning means associated with said platform means for positioning said platform means with respect to said cutter.

2. A file guide for filing a cutter on a saw chain, comprising: a frame including platform means, resilient means engageable with said cutter for supporting said frame thereon, and adjustable positioning means cooperating with said cutter to position said frame with respect thereto; and file guide means on said platform means.

3. A file guide for filing a cutter on a saw chain, comprising: a frame including platform means, a pair of resilient arms extending from said frame and having camming surfaces forming clamping means engageable with the top and side plates of said cutter, said camming surfaces being shaped to act in cooperation with the resiliency of said resilient arm to urge said frame downwardly onto said cutter, height control means limiting downward movement of said frame adjacent the top plate end of said cutter, and gauge means engageable with the tie strap associated with said cutter to limit downward movement of said frame adjacent the depth gauge end of said cutter; and file guide means on said platform means.

4. A file guide for filing a cutter on a saw chain, comprising: a frame including platform means, a pair of resilient arms extending from said frame and having camming surfaces forming clamping means engageable with the top and side plates of said cutter, said camming surfaces being shaped to act in cooperation with the resiliency of said resilient arms to urge said frame downwardly onto said cutter, height control means limiting downward movement of said frame, spring means engageable with said saw chain when said clamping means is engaged with said cutter to pivotally urge said frame about said clamping means, and gauge means engageable with the tie strap associated with said cutter to limit said pivotal movement; and file guide means on said platform means.

5. A file guide for filing a cutter on a saw chain, comprising: a frame including platform means, a pair of resilient arms extending from said frame and having camming surfaces forming clamping means engageable with the top and side plates of said cutter, said camming surfaces being shaped to act in cooperation with the resiliency of said resilient arms to urge said frame downwardly onto said cutter, height control means limiting downward movement of said frame, spring means engageable with said saw chain when said clamping means is engaged with said cutter to pivotally urge said frame about said clamping means, and gauge means engageable with the tie strap associated with said cutter to limit said pivotal movement; means associated with said frame and said gauge means for engaging vertical portions of said chain to prevent pivotal movement of said frame about its longitudinal axis; and file guide means on said platform means.

6. A file guide for filing a cutter on a saw chain, comprising: a frame including platform means, a pair of resilient arms extending from said frame and having camming surfaces forming clamping means engageable with the top and side plates of said cutter, said camming surfaces being shaped to act in cooperation with the resiliency of said resilient arms to urge said frame downwardly onto said cutter, height control means limiting downward movement of said frame, and gauge means engageable with said cutter and its tie strap to limit downward and rearward movement of said frame adjacent the depth gauge end of said cutter.

7. A file guide for filing a cutter on a saw chain, comprising: a frame including platform means, a pair of resilient arms extending from said frame and having camming surfaces forming clamping means engageable with the top and side plates of said cutter, said camming surfaces being shaped to act in cooperation with the resiliency of said resilient arms to urge said frame downwardly onto said cutter, height control means limiting downward movement of said frame, and gauge means engageable with said cutter and its tie strap to limit downward and rearward movement of said frame adjacent the depth gauge end of said cutter; said gauge means being movable with respect to said frame in a direction generally longitudinal of said frame but downwardly rearwardly inclined with respect to said platform means.

8. A file guide for filing a cutter on a saw chain, comprising: a frame including platform means, a pair of resilient arms extending from said frame and having camming surfaces forming clamping means engageable with the top and side plates of said cutter, said camming surfaces being shaped to act in cooperation with the resiliency of said resilient arms to urge said frame downwardly onto said cutter, height control means limiting downward movement of said frame, and gauge means engageable with said cutter and its tie strap to limit downward and rearward movement of said frame adjacent the depth gauge end of said cutter; said gauge means being movable with respect to said frame both in a generally vertical direction and in a direction generally longitudinal of said frame but downwardly rearwardly inclined with respect to said platform means.

9. A file guide for filing a cutter on a saw chain, comprising: a frame including platform means, a pair of resilient arms extending from said frame and having camming surfaces forming clamping means engageable with the top and side plates of said cutter, said camming surfaces being shaped to act in cooperation with the resiliency of said resilient arms to urge said frame downwardly onto said cutter, height control means limiting downward movement of said frame adjacent the top plate end of said cutter, and gauge means engageable with the tie strap associated with said cutter to limit downward movement of said frame adjacent the depth gauge end of said cutter; said clamping means including a pair of transversely oriented and resiliently transversely movable clamping members on said resilient arms, said clamping members having cooperating clamping surfaces defining a transversely expandable V-shaped groove engageable with the top plate and side plate of said cutter to resiliently bias said cutter into supporting engagement with said frame.

10. A file guide for filing a cutter on a saw chain, comprising: a frame including platform means, a pair of resilient arms extending from said frame and having camming surfaces forming clamping means engageable with the top and side plates of said cutter, said camming surfaces being shaped to act in cooperation with the resiliency of said resilient arms to urge said frame downwardly onto said cutter, height control means limiting downward movement of said frame, and gauge means engageable with said cutter and its tie strap to limit downward and rearward movement of said frame adjacent the depth gauge end of said cutter; said gauge means being movable with respect to said frame both in a generally vertical direction and in a direction generally longitudinal of said frame but downwardly rearwardly inclined with respect to said platform means; and shim means insertable between said gauge means and said frame to control the generally vertical movement of said gauge means.

11. A file guide for filing a cutter on a saw chain, comprising: a frame comprising a platform and front and rear saddles; said saddles each having vertically extending shoulders selectively engageable with a vertical portion of said chain; said front saddle having a crown longitudinally inclined with respect to said platform; gauge means secured to said crown; continuously adjustable means for selectively moving said gauge means parallel to said crown; shim means for adjusting positioning said gauge means in a direction normal to said crown; said gauge means having a notch adapted to receive the depth gauge end of said cutter for longitudinal positioning thereof, an ear adapted to engage the top surface of the tie strap associated with said cutter for vertical positioning thereof, and a generally vertical finger adapted to engage another vertical portion of said chain and cooperating with said shoulders to prevent pivotal movement of said frame about its axis; and a pair of vertically rotatable guide rollers adjustably movably mounted on said platform.

12. A file guide for filing a cutter on a saw chain, comprising: a frame comprising a platform and front and rear saddles; said saddles each having vertically extending shoulders selectively engageable with a vertical portion of said chain; said front saddle having a crown longitudinally inclined with respect to said platform; gauge means secured to said crown; continuously adjustable means for selectively moving said gauge means parallel to said crown; said rear saddle carrying a pair of longitudinally extending resilient arms each having at its end a transversely oriented and resiliently transversely movable clamping member, said clamping members having cooperating clamping surfaces defining a transversely expandable V-shaped groove engageable with the top plate and side plate of said cutter to resiliently bias said cutter into supporting engagement with said frame; height control means carried by said rear saddle including a vertically adjustable pin positioned in said V-shaped groove and adapted to engage said top plate to limit the vertical movement of said cutter pursuant to said resilient bias; and a pair of vertically rotatable guide rollers adjustable movably mounted on said platform.

13. A file guide for filing a cutter on a saw chain, comprising: a frame comprising a platform and front and rear saddles; said saddles each having vertically extending shoulders selectively engageable with a vertical portion of said chain; said front saddle having a crown longitudinally inclined with respect to said platform; gauge means secured to said crown; continuously adjustable means for selectively moving said gauge means parallel to said crown; said rear saddle carrying a pair of longitudinally extending resilient arms each having at its end a transversely oriented and resiliently transversely movable clamping member, said clamping members having cooperating clamping surfaces defining a transversely expandable V-shaped groove engageable with the top plate and side plate of said cutter to resiliently bias said cutter into supporting engagement with said frame; height control means carried by said rear saddle including a vertically adjustable pin positioned in said V-shaped groove and adapted to engage said top plate to limit the vertical movement of said cutter pursuant to said resilient bias; spring means carried by said rear saddle and engageable with said saw chain when said clamping members are engaged with said cutter to pivotally urge said frame about said clamping members; and a pair of vertically rotatable guide rollers adjustably movably mounted on said platform.

14. A file guide for filing a cutter on a saw chain, comprising: a frame comprising a platform and front and rear saddles; said saddles each having vertically extending shoulders selectively engageable with a vertical portion of said chain; said front saddle having a crown longitudinally inclined with respect to said platform; gauge means secured to said crown; continuously adjustable means for selectively moving said gauge means parallel to said crown; height control means carried by said rear saddle including a vertically adjustable pin adapted to engage the top plate of said cutter to limit its vertical movement; and a pair of vertically rotatable guide rollers adjustably movably mounted on said platform.

15. A file guide for filing a cutter on a saw chain, comprising: a frame comprising a platform and front and rear saddles; said saddles each having vertically extending shoulders selectively engageable with a vertical portion of said chain; said front saddle having a crown longitudinally inclined with respect to said platform; gauge means secured to said crown; continuously adjustable means for selectively moving said gauge means parallel to said crown; shim means for adjustably positioning said gauge means in a direction normal to said crown; said gauge means having a notch adapted to receive the depth gauge end of said cutter for longitudinal positioning thereof, an ear adapted to engage the top surface of the tie strap associated with said cutter for vertical positioning thereof, and a generally vertical finger adapted to engage another vertical portion of said chain and cooperating with said shoulders to prevent pivotal movement of said frame about its axis; said rear saddle carrying a pair of longitudinally extending resilient arms each having at its end a transversely oriented and resiliently transversely movable clamping member, said clamping members having cooperating clamping surfaces defining a transversely expandable V-groove engageable with the top plate and side plate of said cutter to resiliently bias said cutter into supporting engagement with said frame; height control means carried by said rear saddle including a vertically adjustable pin positioned in said V-shaped groove and adapted to engage said top plate to limit the vertical movement of said cutter pursuant to said resilient bias; spring means carried by said rear saddle and engageable with said saw chain when said clamping members are engaged with said cutter to pivotally urge said frame about said clamping members; and a pair of vertically rotatable guide rollers adjustably movably mounted on said platform and selectively cooperating each with one of said resilient arms to limit longitudinal movement of a file placed on said platform to a predetermined position.

References Cited

UNITED STATES PATENTS 2,171,169   8/1939   Woodbury _____ 76—31

GRANVILLE Y. CUSTER, JR., *Primary Examiner.*